United States Patent
Holsten

(10) Patent No.: US 9,120,274 B2
(45) Date of Patent: Sep. 1, 2015

(54) METHOD FOR PRODUCING A HOLLOW COMPONENT AND DEVICE

(75) Inventor: Jan-Peter Holsten, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 255 days.

(21) Appl. No.: 13/283,296

(22) Filed: Oct. 27, 2011

(65) Prior Publication Data

US 2012/0111486 A1    May 10, 2012

Related U.S. Application Data

(60) Provisional application No. 61/410,138, filed on Nov. 4, 2010.

(30) Foreign Application Priority Data

Nov. 4, 2010   (DE) .......................... 10 2010 043 415

(51) Int. Cl.
*B29C 70/30* (2006.01)
*B29C 70/34* (2006.01)
*B29C 70/32* (2006.01)
*B64C 1/00* (2006.01)

(52) U.S. Cl.
CPC ............... *B29C 70/342* (2013.01); *B29C 70/32* (2013.01); *B64C 2001/0072* (2013.01); *Y02T 50/433* (2013.01); *Y10T 156/1033* (2015.01)

(58) Field of Classification Search
CPC .. B20C 70/232; B20C 70/326; B29C 70/443; B29C 70/232; B29C 70/236
USPC ......... 156/166, 245, 523, 574, 577, 173, 381, 156/382; 264/257, 258, 308, 328.1, 262, 264/267, 310, 311
See application file for complete search history.

(56) References Cited

U.S. PATENT DOCUMENTS

| | | | | |
|---|---|---|---|---|
| 2,633,605 | A * | 4/1953 | Brucker | 264/257 |
| 3,788,916 | A * | 1/1974 | Brucker | 156/74 |
| 4,633,632 | A | 1/1987 | Sarh | |
| 4,717,330 | A | 1/1988 | Sarh | |
| 7,080,441 | B2 * | 7/2006 | Braun | 29/527.2 |
| 7,282,107 | B2 * | 10/2007 | Johnson et al. | 156/169 |
| 2006/0096700 | A1 | 5/2006 | Clark et al. | |
| 2009/0139641 | A1 * | 6/2009 | Chapman et al. | 156/242 |
| 2012/0055617 | A1 * | 3/2012 | Van Vuegt et al. | 156/184 |

FOREIGN PATENT DOCUMENTS

| | | |
|---|---|---|
| DE | 1 729 060 | 6/1971 |
| DE | 10 2005 020 907 | 12/2005 |
| DE | 10 2007 027 113 | 12/2008 |

(Continued)

OTHER PUBLICATIONS

Chinese Search Report, Dec. 12, 2013.

*Primary Examiner* — Michael N Orlando
*Assistant Examiner* — Scott W Dodds
(74) *Attorney, Agent, or Firm* — Greer Burns & Crain, Ltd.

(57) ABSTRACT

A method and apparatus for producing a hollow component, in particular in the field of aviation or aerospace, including the following steps: provision of an inner contour closed along its circumference; laying of a fiber material over the inner contour; and curing of a matrix of the fiber material to form the component.

5 Claims, 7 Drawing Sheets

(56) References Cited

FOREIGN PATENT DOCUMENTS

| | | | |
|---|---|---|---|
| DE | 10 2007 060 029 | 6/2009 | |
| EP | 0 142 697 | 5/1985 | |
| EP | 198744 A1 * | 10/1986 | ............. B29C 67/14 |
| WO | 2009074419 | 6/2009 | |

* cited by examiner

Fig. 3  (A - A)

METHOD FOR PRODUCING A HOLLOW COMPONENT AND DEVICE

CROSS-REFERENCE TO RELATED APPLICATIONS

This application claims the benefit of U.S. Provisional Application No. 61/410,138, filed Nov. 4, 2010 and German Patent Application No. 10 2010 043 415.9, filed Nov. 4, 2010, the entire disclosures of which are herein incorporated by reference.

FIELD OF THE INVENTION

The present invention relates to a method for producing a hollow component and to a device.

Although it is applicable to any component, the present invention and the problem on which it is based will be explained in detail with respect to a fuselage segment for an aircraft.

Production of fuselage segments is known, for example from EP 0 142 697 A1. In the method described therein, a circular cylindrical shaped article is bandaged with a prepreg material. Once the prepreg material has been cured, the shaped article is removed from the fuselage segment which has now been formed. Finally, a plurality of fuselage segments formed in this way are joined to form a fuselage.

In the case of the above-described approach, it has disadvantageously emerged that it is difficult to reliably maintain tolerances on the outer face of the fuselage segment formed. This is problematic, in particular when joining the plurality of fuselage segments, as a smooth outer skin of the fuselage cannot consequently be formed. With regard to aerodynamics of the fuselage, this is hardly acceptable.

SUMMARY OF THE INVENTION

The object of the present invention is to at least reduce the above-described disadvantage.

Accordingly, a method for producing a hollow component is provided, in particular in the field of aviation or aerospace, comprising the following steps: provision of an inner contour closed along its circumference; laying of a fibre material over the inner contour; and curing of a matrix of the fibre material to form the component.

Furthermore, a device is provided, in particular for use in the method according to the invention, comprising: an inner contour closed along its circumference; and a laying device for the laying of fibre material over the inner contour.

The idea on which the present invention is based consists in the ability to form the component with an outer contour which lies within narrow tolerances by means of the inner contour which is closed along its circumference. A plurality of components of this type, in particular fuselage segments, can thus be joined flush to one another with respect to their outer contour. The fact that, depending on the circumstances, the inner contours of the components formed in this way can be subject to greater tolerance variations is harmless. This is because tolerance variations of this type can easily be compensated for, for example by means of doublers, and do not have a negative effect on the aerodynamics of the fuselage where components of fuselage segments are concerned. Furthermore, owing to the circumstance that the inner contour is closed along its circumference, cylindrical, in particular circular cylindrical, or other hollow components are produced in one piece.

Advantageous configurations of the invention are provided in the dependent claims.

According to a configuration of the method according to the invention, the inner contour is formed on the inner face of at least one shell. It is preferable for a plurality of shells to be provided, which, assembled to form a sleeve, form the inner contour internally. The use of a plurality of shells has the advantage that the formed component can easily be removed from the shells once the matrix of the fibre material has been cured.

According to a further configuration of the method according to the invention, the fibre material is laid by means of rotating the at least one shell about its central axis and/or rotating a laying device for laying the fibre material about the central axis of the at least one shell. Alternatively or additionally, the at least one shell and the laying device can be moved towards one another along the central axis. The fibre material, for example along the circumference of the inner contour, can thus easily be laid in the longitudinal direction of the inner contour (that is to say parallel to the central axis of the inner contour) or in a spiral along the inner contour.

According to a further configuration of the method according to the invention, the at least one shell is closed in a pressure-tight manner at its end faces and the fibre material laid on its inner contour is pressurised with a fluid to compact the matrix in the fibre material. This means that on the one hand, a fibre-composite material of high quality, that is to say in particular with a homogeneous distribution of the matrix in the fibre material, is achieved. On the other hand, tolerances can therefore also be better controlled on the inner contour of the formed component.

According to a further configuration of the method according to the invention, the fibre material is covered on the inner face by a film before the end faces of the at least one shell are closed. The film prevents the fluid from coming into contact with the fibre material and damaging it.

According to a further configuration of the method according to the invention, at least one further shell is firstly introduced into the at least one shell and hereafter a gap formed between the further shell and the film is pressurised with the fluid. The space to be filled by the fluid can be minimised by means of the further shell. The fluid requirements are thus reduced. The one or more of further shells preferably form an inner sleeve.

According to a further configuration of the method according the invention, the fibre material is impregnated with a matrix before laying. The fibre material is thus prepreg material, for example. Furthermore, the fibre material can be formed as tape. The fibre material is preferably provided as continuous material. The matrix may be an epoxy resin or thermoplastic matrix, or a mixture thereof.

According to a further preferred configuration of the device according to the invention, the inner contour is formed at the inner face of at least one shell. The advantages connected herewith have already been explained above.

According to a further configuration of the device according to the invention, the at least one shell is rotatable about a central axis thereof. For example, the at least one shell can be closed at one or both of its end faces by means of corresponding covers. The at least one shell can then be connected, by means of at least one of these covers, to a device for rotating the shell.

According to a further preferred configuration of the device according to the invention the laying device is rotatably mounted inside the shell about central axis thereof. The laying device is preferably mounted rotatably, in particular axially displaceably, on a shaft provided coaxially with the central axis. The shaft can be connected to one or both of the covers which close the at least one shell at its end faces.

According to a further configuration of the device according to the invention, the laying device comprises one or more laying heads, in each case for laying the fibre material. As a result, the process time of laying of the fibre material can be reduced. The laying heads can, for example, be provided offset from one another axially (that is to say along the central axis of the shell) and/or in a circumferential direction. For example, the fibre material can therefore easily be laid in spiral turns over the inner contour.

According to a further configuration of the device according to the invention, the at least one shell can be closed in a pressure-tight manner at its end faces for a pressurisation of the fibre material laid over the inner contour of the at least one shell. The associated advantages have already been mentioned.

According to a further configuration of the device according to the invention, at least one further shell is arranged in the at least one shell, wherein the fluid for the pressurisation can be introduced between the at least one further shell and the at least one shell. The at least one further shell is preferably displaceable along the central axis of the shell and can be moved into or out of the inner contour according to the production step.

According to a further configuration of the device according to the invention, the laying device is formed as an automatic tape layer. This means that a short process time for laying the fibre material is achieved. More preferably, each of the laying heads is formed as an automatic tape layer.

The inner contour preferably has a circular or oval cross-section.

BRIEF DESCRIPTION OF THE DRAWINGS

In the following, the invention will be described in greater detail on the basis of embodiments with reference to the accompanying figures of the drawings, in which.

DESCRIPTION OF EXEMPLARY EMBODIMENTS

Figure 1:
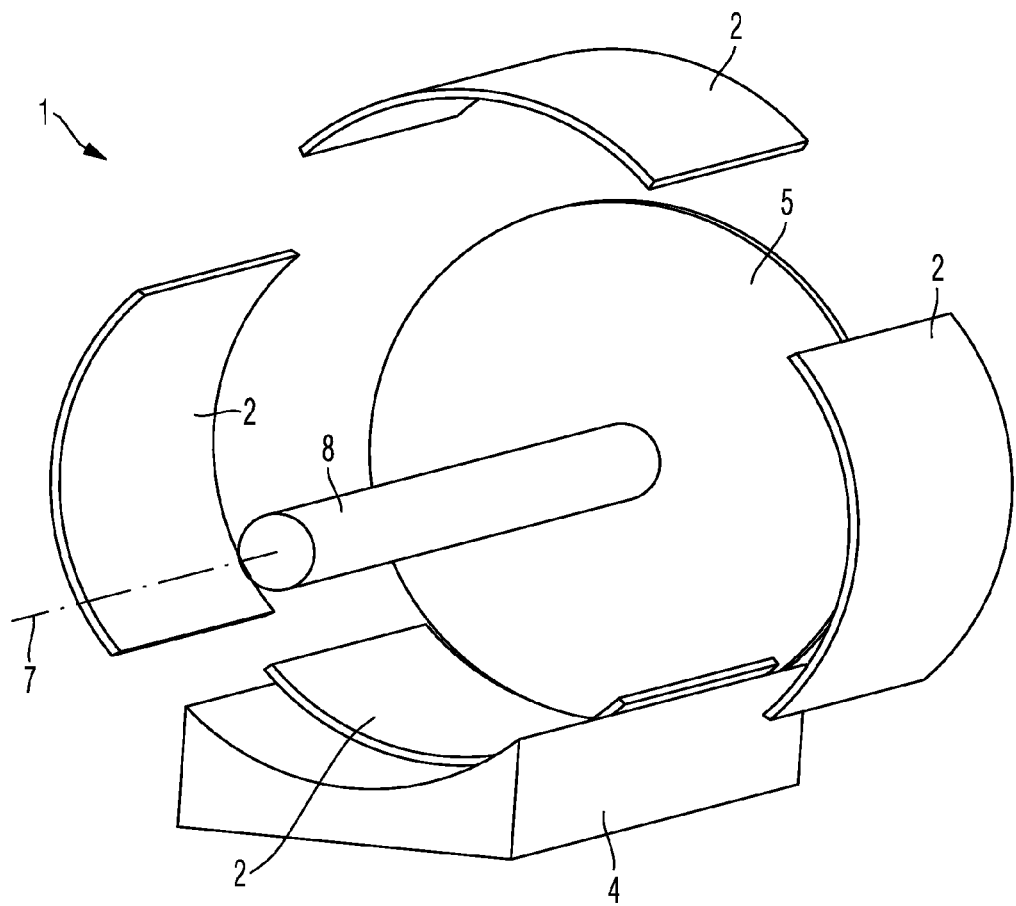
FIG. 1 is a perspective view of a device according to an embodiment of the present invention, wherein three shells of the device are shown as individual parts.

In the figures, like reference numerals denote like or functionally like components, unless indicated otherwise.

FIG. 1 shows a device 1 according to an embodiment of the present invention.

The device 1 comprises for example four shells 2, which are detachably connectable to one another.

Figure 2:
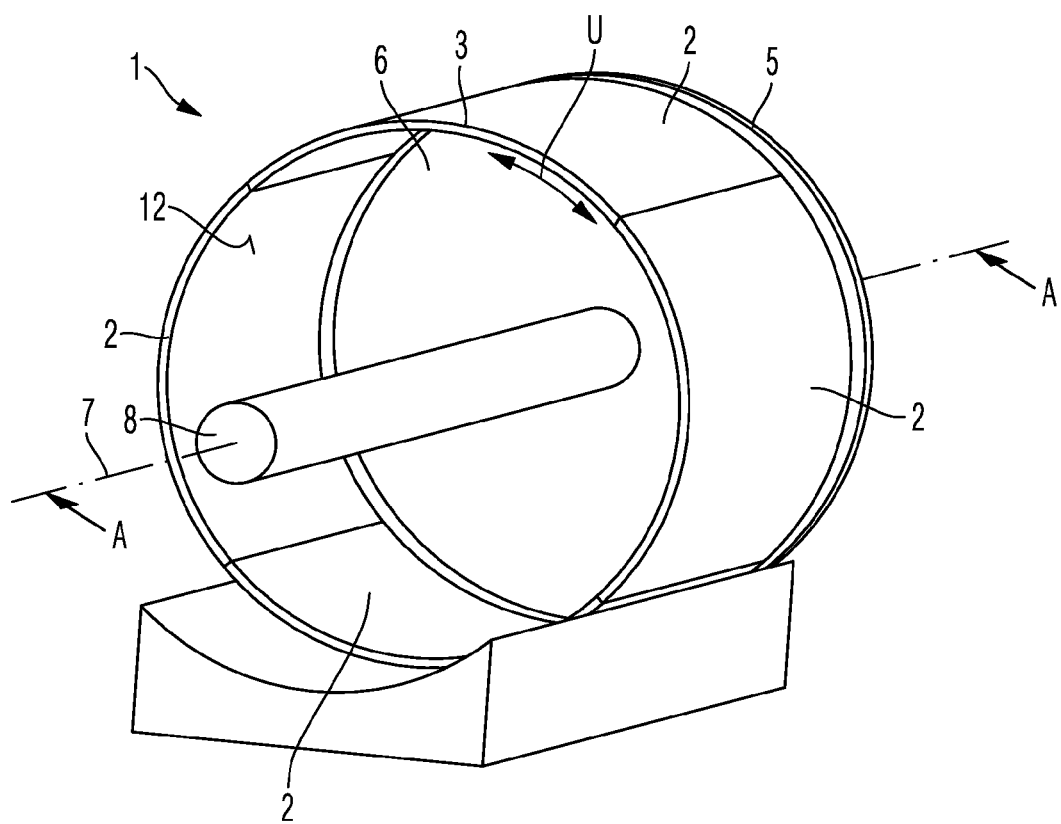
FIG. 2 is a perspective view of the device from FIG. 1, wherein the three shells are joined to form an outer sleeve.

FIG. 2 shows the device 1 from FIG. 1, wherein the shells 2 are connected to one another to form an outer sleeve 3.

The outer sleeve 3 has a substantially circular cross-section. Alternatively, the outer sleeve 3 could also have an oval cross-section.

Returning to FIG. 1, it can further be seen that the device 1 comprises a support 4, to which the lower shell 2 can be rigidly connected.

Furthermore, it can be seen in FIG. 1 that the device 1 comprises a cover 5. The cover 5 closes the sleeve 3 at one of its end faces 6 (see FIG. 2).

A shaft 8 is further provided coaxially with a central axis 7 of the outer sleeve 3. The shaft 8 can be fixed centrally to the cover 5.

Once the shells 2 have been connected to form the outer sleeve 3 (see FIG. 2), the inner faces of the shells 2 form an inner contour 12. The inner contour 12 is closed in its circumferential direction U. Furthermore, the inner contour 12 can be closed along the central axis 7.

Figure 3:
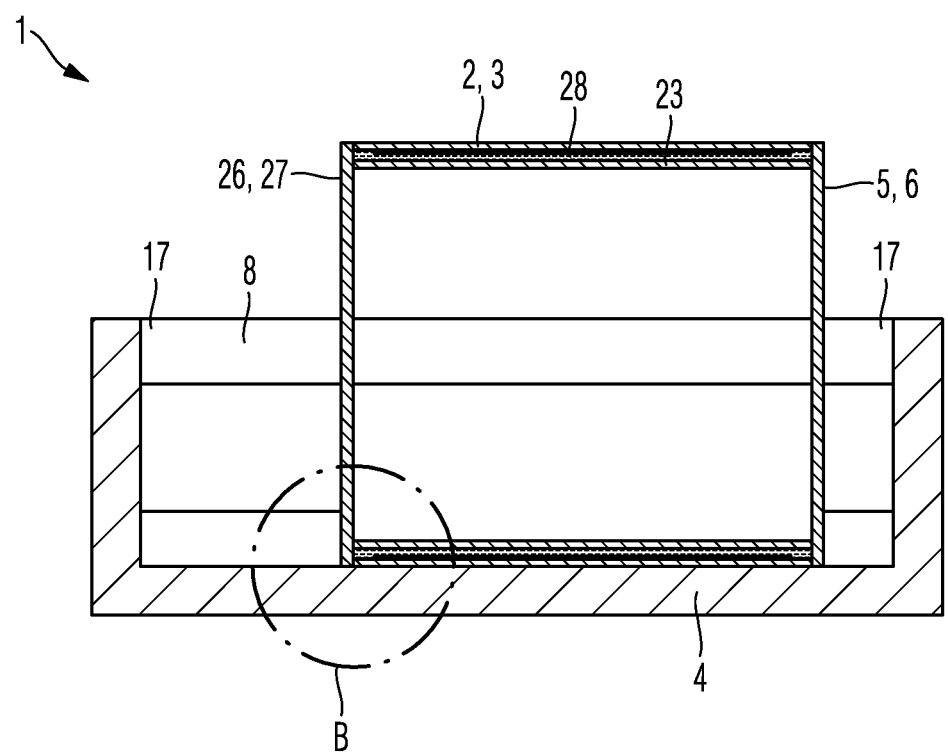
FIG. 3 is a sectional view along A-A from FIG. 2, wherein further components of the device are additionally shown.
Figure 4:
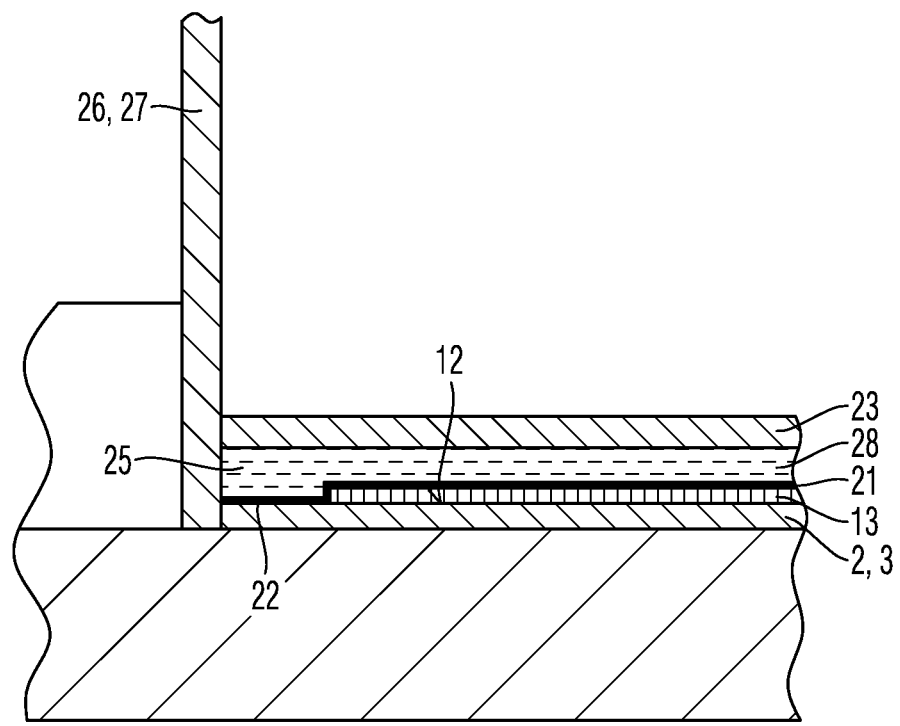
FIG. 4 is an enlarged view of the detail B from FIG. 3.

FIG. 3 shows a sectional view along A-A from FIG. 2, wherein further components of the device 1 are additionally shown, and FIG. 4 shows an enlarged view of detail B from FIG. 3.

In a method step that follows the method state shown in FIG. 2, a fibre material 13 is laid over the inner contour 12. This can, for example, be carried out by means of a laying device 14, as shown in FIG. 5.

Figure 5:
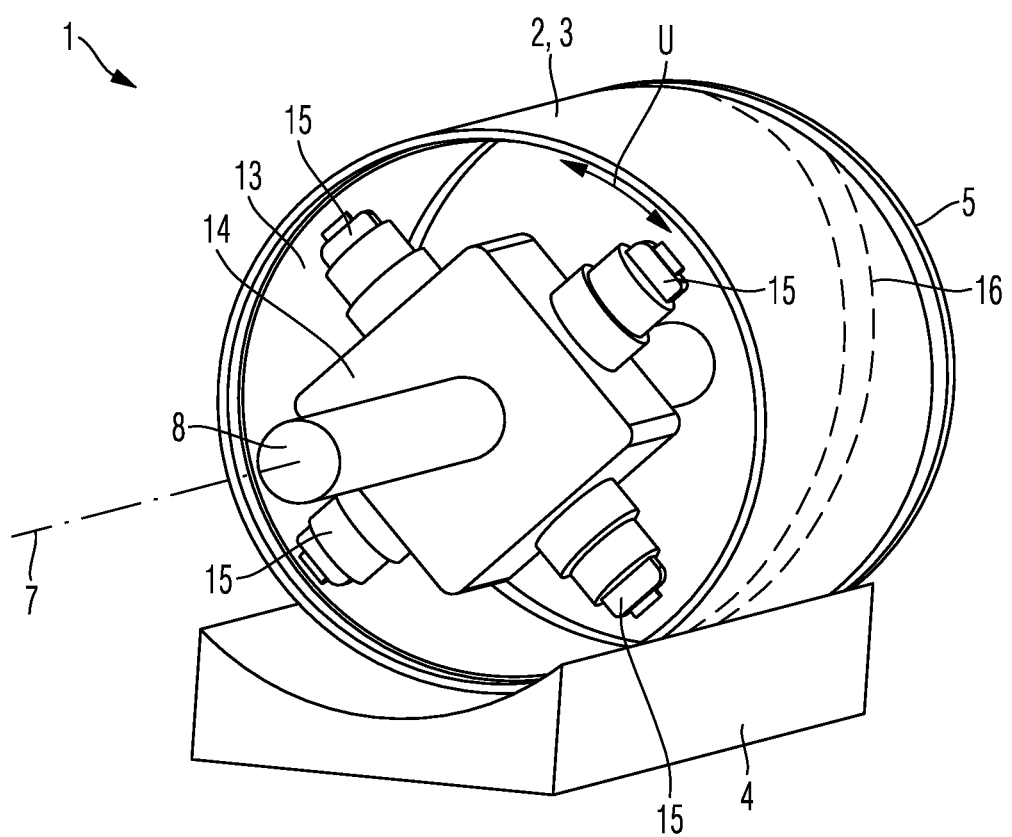
FIG. 5 is a perspective view of the device from FIG. 2, wherein an inner sleeve of this device is additionally shown.

FIG. 5 shows the view from FIG. 2 with the laying device 14.

The laying device 14 can, for example, comprise four laying heads 15. The laying heads 15 can be spaced from one another in a circumferential direction U or along the central axis 7. Each laying head 15 is preferably designed for the automatic laying of continuous tape. The laying device 14 is preferably mounted rotatably on the shaft 8 so that the laying heads 15 are moved along the inner contour 12 when the laying device 14 rotates about the central axis 7. Furthermore, the laying device 14 can be movable along the central axis 7. Furthermore, the outer sleeve 3 can be rotatable about the central axis 7 in an embodiment in which the lower shell 2 (see FIG. 1) is not rigidly connected to the support 4. Since the laying heads 15 are offset from one another along the central axis 7 and are rotated, spiral tape turns (for example indicated by reference numeral 16) can be easily produced. As shown in FIG. 3, the shaft 8 can be supported on the support 4 at its opposite ends 17.

The tape 13 that has been laid preferably already comprises a matrix, in particular an epoxy resin matrix. It is however also possible to lay a dry fibre material by means of the laying heads 15, for example together with a binder. In this case, the laid fibre material 13 would be infiltrated with a matrix in a following step.

In a further step a film 21 (see FIG. 4) is now laid over the laid fibre material 13 with the matrix. The film 21 can be sealed on the inner contour 12 for example at points 22 on the inner contour 12. In order to allow a pressure compensation for the volumes trapped between the film 21 and a respective shell 2, a corresponding ventilation device can be provided (not shown).

Figure 6:
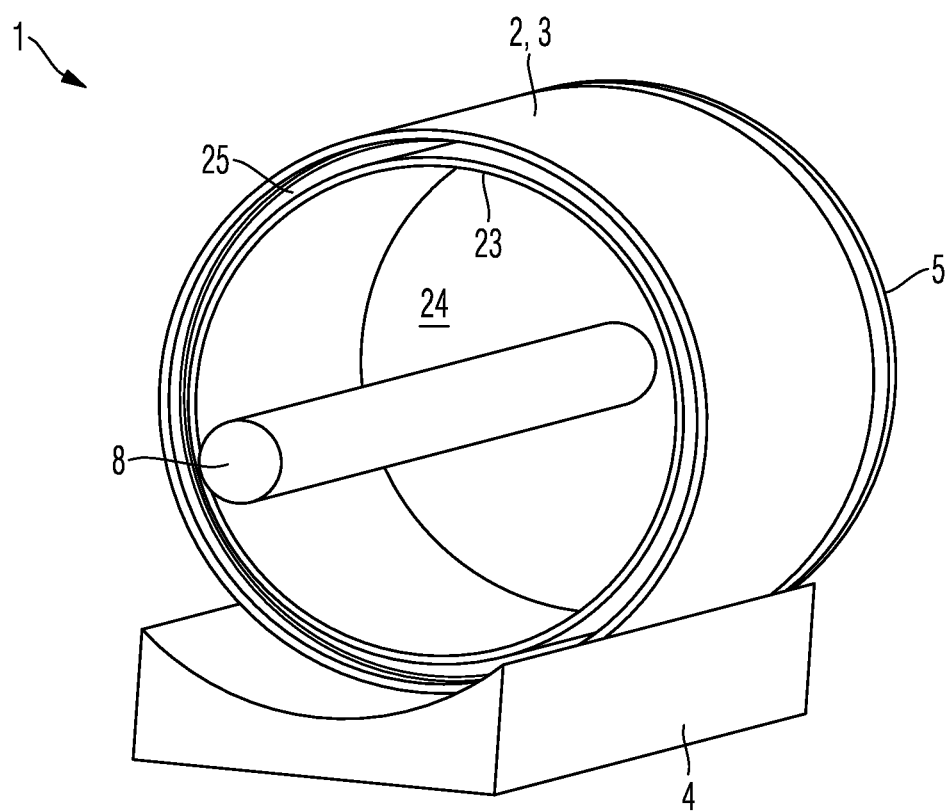
FIG. 6 is a perspective view of the device from FIG. 2, wherein a laying device thereof is additionally shown.

FIG. 6 shows the view from FIG. 2 with an inner sleeve 23.

In a further method step, as shown in FIG. 6, the inner sleeve 23 is now introduced into the volume 24 enclosed by the shells 2 and the outer sleeve 3. The inner sleeve 23, together with the shells 2 and the outer sleeve 3, delimits hereafter an annular gap 25. The inner sleeve 23 can consist of one or more shells.

In a further method step the shells 2 and the outer sleeve 3 are now closed at their other end face 26 (see FIGS. 3 and 4) by means of a cover 27. The gap 25 is then closed in a pressure-tight manner over its entire circumference and is connected in a manner that is not shown to a pressurisation device (not shown). The pressurisation device then pumps a fluid 28, in particular water or oil, into the gap 25. This results in a higher pressure, which presses against the laid fibre material 13 by means of the film 21 and thus compacts the fibre material. Consequently, the quality of the finished component is improved. The fluid can also additionally be used as temperature transmission means to transfer or establish the temperature necessary for the curing process.

In a further step, the heat is preferably fed to the fibre material 13 with the matrix, in order to cure the matrix.

The cover 27, the inner sleeve 23 and the film 21 are subsequently detached. The shells 2 are then separated again from one another, leaving the finished component, in particular a fuselage segment.

Figure 7:
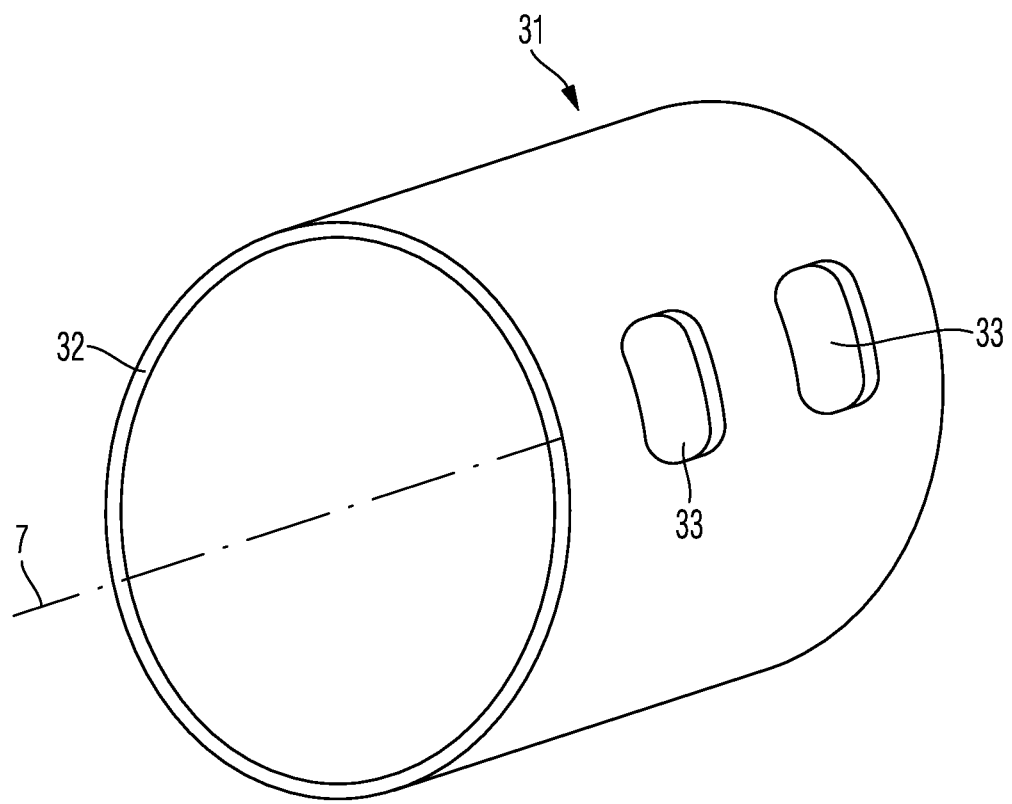
FIG. 7 is a perspective view of a component produced by means of the device from FIG. 1 to 6.

FIG. 7 shows a perspective view of the component 31 produced by means of the above-described method and the above-described device 1.

For example, component 31 is cylindrical with an annular cross-section 32. Alternatively, the cross-section 32 could also be oval. Furthermore, the laying device 14 (see FIG. 5) can be controlled in such a way that the window cut-outs 33 are left open, that is to say no fibre material is laid in the regions 33.

Although the present invention has been described by way of preferred embodiments, it is in no way limited thereto, but can be modified in various ways. In particular, it should be pointed out that the configurations and embodiments described in this instance for the method according to the invention can be correspondingly applied to the device according to the invention, and vice versa. Furthermore, "a" or "one" does not exclude a plurality in the present case.

In the following preferred embodiments of the method and of the device are explained.

1. A method for producing a hollow component, in particular in the field of aviation or aerospace comprising the following steps:
provision of an inner contour closed along its circumference;
laying of a fibre material over the inner contour; and
curing of a matrix of the fibre material to form the component.
2. The method according to embodiment 1, wherein the inner contour is formed on the inner face of at least one shell.
3. The method according to embodiment 2, wherein the fibre material is laid by means of rotating the at least one shell about its central axis and/or rotating a laying device for laying the fibre material about the central axis of the at least one shell.
4. The method according to embodiment 2, wherein the at least one shell is closed in a pressure-tight manner at its end faces and the fibre material laid over the inner contour of said shell is pressurised with a fluid to compact the matrix in the fibre material.
5. The method according to embodiment 4, wherein the inner face of the fibre material is covered with a film before the end faces of the at least one shell are closed.
6. The method according to embodiment 5, wherein at least one further shell is first introduced into the at least one shell, and hereafter a gap formed between the at least one further shell and the film is pressurised with the fluid.
7. The method according to embodiment 1, wherein the fibre material is impregnated with a matrix before laying.
8. A device, in particular for use in the method according to embodiment 1, comprising:
an inner contour closed along its circumference; and
a laying device for laying fibre material over the inner contour.
9. The device according to embodiment 8, wherein the inner contour is formed on the inner face of at least one shell.
10. The device according to embodiment 9, wherein the at least one shell is rotatable about a central axis thereof.
11. The device according to embodiment 9, wherein the laying device inside the shell is mounted rotatably about the central axis thereof.
12. The device according to embodiment 8, wherein the laying device comprises one or more laying heads in each case for laying the fibre material.
13. The device according to embodiment 9, wherein the at least one shell can be closed with a fluid in a pressure-tight manner at its end faces for a pressurisation of the fibre material laid over the inner contour of the at least one shell.
14. The device according to embodiment 13, wherein at least one further shell is arranged in the at least one shell, it being possible to introduce the fluid for pressurisation between the at least one further shell and the at least one shell.
15. The device according to embodiment 8, wherein the laying device is formed as an automatic tape layer.

LIST OF REFERENCE NUMERALS 1 device
2 shell
3 outer sleeve
4 support
5 cover
6 end face
7 central axis
8 shaft
12 inner contour
13 fibre material
14 laying device
15 laying head
16 spiral
17 end
21 film
22 point
23 inner sleeve
24 volume
25 gap
26 end face
27 cover
28 fluid
31 component
32 cross-section
33 window cut-out
U circumferential direction

The invention claimed is:

1. A device for use in producing a hollow component, comprising:
an outer shell, which on its inner face forms an inner contour which is closed along its circumference, wherein said inner contour forms the outer contour of said hollow component;
a laying device for laying fibre material over the inner contour;
a film capable of covering the inner face of fibre material laid by the laying device;
at least one cover for closing the outer shell in a pressure-tight manner at its end faces;
at least one inner shell arrangeable within the outer shell so as to form an annular gap between the outer shell and the at least one inner shell that is closed by the at least one cover; and a pressurization device for introducing a liquid into the annular gap between the at least one inner shell and the film for a pressurization of the fibre material covered with the film, wherein said liquid is used as a temperature transmission means to perform at least one of transferring and establishing the temperature necessary for a curing process during producing said hollow component.

2. The device according to claim 1, wherein the outershell is rotatable about a central axis thereof.

3. The device according to claim 1, wherein the laying device inside of the outer shell is mounted rotatably about a central axis thereof.

4. The device according to claim 1, wherein the laying device comprises one or more laying heads, in each case for laying the fibre material.

5. The device according to claim 1, wherein the laying device is formed as an automatic tape layer.

* * * * *